Feb. 3, 1942.                W. G. WATKINS                2,271,786
                            SAFETY RELIEF VALVE
                            Filed Nov. 22, 1940

INVENTOR.
Walter G. Watkins
BY
ATTORNEY.

Patented Feb. 3, 1942

2,271,786

UNITED STATES PATENT OFFICE 2,271,786

SAFETY RELIEF VALVE

Walter G. Watkins, North Kansas City, Mo.

Application November 22, 1940, Serial No. 366,606

5 Claims. (Cl. 137—53)

This invention relates to relief valves of the safety type and has for its salient object, the provision of an effective attachment for containers of fluids, liquids or gases that will relieve internal pressure when the same becomes greater than that desired.

One of the important objects of this invention is to provide a safety relief valve having means for relieving the pressure of a closed container at any desired point and thereafter, completely opening the container to the atmosphere, if the temperature suddenly rises due to the application of heat.

A still further object of this invention is to provide a valve of the aforementioned character that is effective in application and operation, inexpensive to produce and install, and easy to manipulate to cause operation of its parts when the internal pressure of the container with which the valve is used, reaches a predetermined point or if the temperature of the fusible metal reaches the melting point due to the application of heat in a more or less instantaneous manner.

Advantages of a valve constructed in accordance with this invention, the manner of installation, setting and employment, will become clear to one skilled in the art during the course of the following specification, referring to the accompanying drawing wherein.

Figure 1:
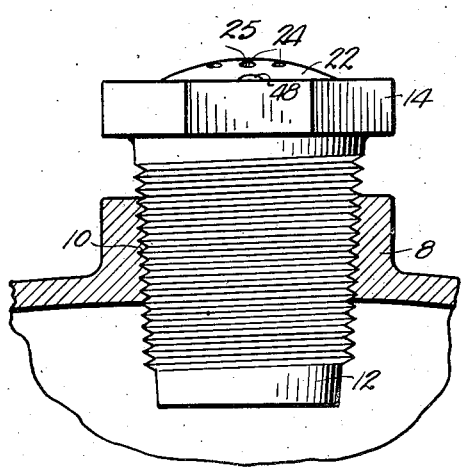
Figure 1 is a side elevational view of a safety relief valve made to embody the present invention and in operative position on a container.
Figure 2:
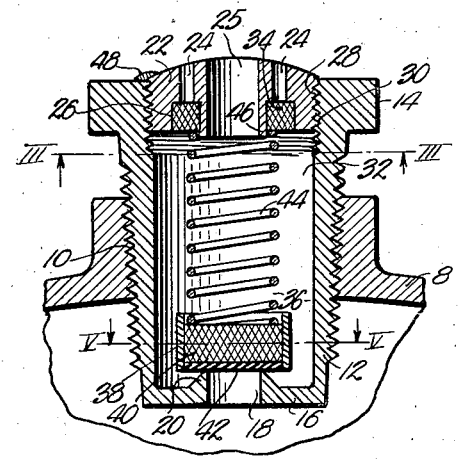
Fig. 2 is a central longitudinal sectional view through the valve.
Figure 3:
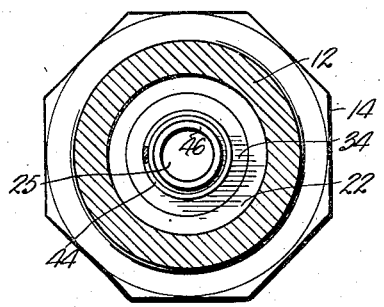
Fig. 3 is a cross sectional view through the same taken on line III—III and looking in the direction of the arrows.
Figure 4:
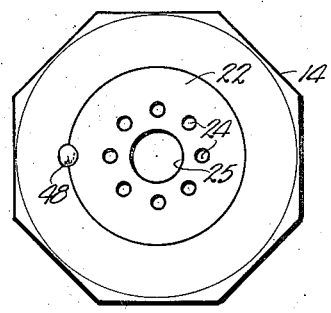
Fig. 4 is a top plan view of the valve.
Figure 5:
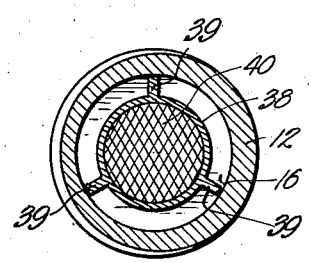
Fig. 5 is a fragmentary cross sectional view through the same taken on line V—V of Fig. 2.

The container 8 with which my safety relief valve is particularly useful, has an internally threaded opening 10 into which the externally threaded body 12 is fitted. Body 12 is thimble-shaped in form with a polygonal flange 14 integral therewith near the open end by means of which body 12 may be tightened into opening 10 by a wrench or the like.

End wall 16 of body 12 is provided with a passage 18 around which is created an internal valve seat 20. The normally open end of body 12 is closed by a plug 22 having a plurality of openings 24 drilled, or otherwise created therethrough, all of which are in communication with an annular groove 26 extending inwardly from one face of plug 22. A vent hole 25 formed centrally through plug 22 is unrestricted when the valve and its parts are in normal condition. This plug is externally threaded as at 28 to engage internal threads 30 formed on the inner face of body 12 and when the plug is in normal position, chamber 32 is restricted at the normally open end.

A filling of fusible metal 34 in groove 26 closes the inner ends of openings 24 and lies in opposed relation to a valve member, generally designated by the numeral 36. This said valve member comprises a ring 38 having guide legs 39, a partial filling 40 of fusible metal or other similar substance, and a facing 42 of resilient, yieldable substance that bears directly against valve seat 20, but which is incapable of withstanding pressure without suitable backing, in this instance, fusible metal 40.

Ring 38 projects upwardly beyond the surface of filling 40 to present a retainer for one end of a compression spring 44, positioned between plug 22 and valve member 36. The opposite end of spring 44 is held against lateral displacement by an annular flange 46 integral with plug 22. Thus, spring 44 is maintained between fusible filling 34 in groove 26, and fusible filling 40 of valve member 36.

When the safety valve is assembled, plug 22 is moved into cavity 32 the distance necessary to compress spring 44. A spot of solder or the like 48 is then dropped on the joint between body 12 and plug 22 to preclude further movement of the latter.

When the invention is embodied in the illustrated preferred form of the valve, it will function as contemplated by the broader concepts of the invention and as follows:

Container 8 may have liquefied petroleum gas, or any other substance under pressure therein, which when subjected to heat, will cause the internal pressure of container 8 to rise beyond the point of safety. When such rise of pressure occurs, spring 44 will be compressed, valve member 36 lifted from seat 20, and a portion of the contents of container 8 allowed to escape to the atmosphere through passage 18, chamber 32 and hole 25 to maintain a safe pressure.

If fire is encountered or heat is directly applied to container 8 around the valve forming a part thereof, filling 34 will melt before the pressure rises to a point where the valve normally opens, as above described. A portion of spring 44 at one end thereof will be projected into groove 26 to decrease the tension thereof and the force upon valve member 36, thus resetting the valve to operate at a lower and safer pressure. The lower pressure will be maintained in container 8 after the danger has passed, due to the length of spring 44 and melting of filling 34. If, however, a temperature high enough to melt filling 40 is reached, it will melt and blow out to immediately open the interior of container 8 to the atmosphere. The contents of container 8 will pass quickly through passage 18, chamber 32, hole 26 and openings 24.

The cross sectional area of hole 25 must be as great as the cross sectional area of passage 18 so that an unrestricted escape for the contained gas is afforded. Openings 24 present additional relief openings when quick relief is necessary. When this safety relief valve is employed in the shipment or handling of liquefied petroleum gases, fusible metal 34 and 40 should have a melting point of 165° F.

From the foregoing, it is obvious that when a valve constructed as described is employed to safeguard a container 8, the pressure therein will be relieved when the same rises above a predetermined point due to gradual application of heat—under this condition the valve serves as a relief valve of known characteristics. If the application of heat by fire or the like is encountered, all of the contents of container 8 will not be lost for the pressure will be relieved by melting of metal 34 to reduce the tension of spring 44, whereupon the valve functions as above, but at a lower pressure. The intense fire, for example, likely to present hazards and loss of equipment due to sudden rise in pressure in container 8, causes metal 40 to melt to completely evacuate the tank and therefore, reduce to nil the possibilities of danger and loss.

Valve 36 may be made without facing 42 if desired, for fusible metal against seat 20 will insure opening when complete evacuation results from heat intense enough to melt material 40.

Facing 42 is employed, however, to overcome the well-known "sticking" when the valve operates without melting material 40. The facing is thin and of a character which will not allow it to restrict the flow of gas from container 8 when complete evacuation occurs.

The broad objects of this invention contemplate embodying the ideas in structures other than illustrated and described, and therefore, it is desirable to be limited only by the scope of the appended claims.

Having thus described the invention, what is claimed as new and desired to be secured by Letters Patent is:

1. A relief valve of the character described comprising a body provided with a chamber therein and a passage extending from the chamber to the exterior surface of the body at one end of the latter; a plug provided with openings therethrough mounted in the chamber at the opposite end of the body; a valve member normally closing the passage; fusible material closing certain of the openings in the plug, said plug having an annular groove therein in communication with all the openings in the plug, said fusible material closing the openings being in the form of a filling for the said groove; and a spring bearing against the fusible material in the groove and yieldably holding the valve member in the normal position.

2. A relief valve of the character described comprising a thimble-shaped body provided with a passage through the closed end thereof; a valve seat around the passage; a plug having openings therethrough in screwthreaded engagement with the body at the open end thereof, said plug having an annular groove formed in the inner face thereof in communication with the openings; a filling of fusible material in the groove closing the openings; a valve member of fusible material normally resting on the valve seat; and a compression spring extending between the fusible filling of the plug groove and said valve member.

3. A relief valve of the character described comprising a thimble-shaped body provided with a passage through the closed end thereof; a valve seat around the passage; a plug having openings therethrough in screwthreaded engagement with the body at the open end thereof, said plug having an annular groove formed in the inner face thereof in communication with the openings; a filling of fusible material in the groove closing the openings; a valve member of fusible material normally resting on the valve seat; and a compression spring extending between the fusible filling of the plug groove and said valve member, said plug having a central, unrestricted opening therethrough.

4. A relief valve of the character described comprising a body provided with a chamber therein and a passage extending from the chamber to the exterior surface of the body at one end of the latter; a valve member normally closing the passage; a plug provided with an opening therethrough mounted in the chamber at the opposite end of the body, said plug having an annular groove therein having a filling of fusible material in said groove; and a spring bearing against the fusible material in the groove and yieldably holding the valve member in the normal position.

5. A relief valve of the character described comprising a body provided with a chamber therein and a passage extending from the chamber to the exterior surface of the body at one end of the latter; a valve member normally closing the passage; a plug provided with an opening therethrough mounted in the chamber at the opposite end of the body, said plug having an annular groove therein having a filling of fusible material in said groove; and a spring bearing against the fusible material in the groove and yieldably holding the valve member in the normal position, means for locking the plug in position, said plug being initially adjustable to establish a predetermined tension in said spring.

WALTER G. WATKINS.